United States Patent [19]
Cole

[11] 3,724,218
[45] Apr. 3, 1973

[54] ENGINE EXHAUST REACTOR AND METHOD OF MAKING

[75] Inventor: Edward N. Cole, Bloomfield Hills, Mich.

[73] Assignee: General Motors Corporation, Detroit, Mich.

[22] Filed: May 4, 1971

[21] Appl. No.: 140,035

[52] U.S. Cl. ..................60/282, 60/323, 60/305, 164/98, 23/277 C
[51] Int. Cl. ..............................F01n 3/10, F01n 7/18
[58] Field of Search.......164/98; 181/33 A, 40, 36 C; 60/272, 282, 302, 303, 304, 305, 323; 23/277 C

[56] References Cited

UNITED STATES PATENTS

| | | |
|---|---|---|
| 3,413,803 | 12/1968 | Rosenlund..............................60/282 |
| 3,568,723 | 3/1971 | Sowards.................................164/98 |
| 3,581,494 | 6/1971 | Scheitlin.................................181/40 |

FOREIGN PATENTS OR APPLICATIONS

| | | | |
|---|---|---|---|
| 240,220 | 9/1925 | Great Britain..........................181/40 |
| 524,182 | 7/1940 | Great Britain..........................60/272 |
| 680,613 | 1/1930 | France ....................................60/272 |

Primary Examiner—Douglas Hart
Attorney—J. L. Carpenter and Robert J. Outland

[57] ABSTRACT

An exhaust reactor for an internal combustion engine is preferably formed as a large volume manifold having a cast iron outer shell containing a baffled sheet metal inner liner with an intermediate insulating layer of core sand encapsulated between the walls of the inner liner and outer shell. The reactor is constructed by first fabricating the metal inner liner, then applying the insulating layer of core sand to the outer surfaces of the liner exclusive of certain protruding portions, casting the iron outer shell around the sand core and sheet metal liner so as to completely encapsulate the sand layer between the inner layer and outer shell.

8 Claims, 3 Drawing Figures

INVENTOR.
Edward N. Cole
BY
Robert J. Outland
ATTORNEY

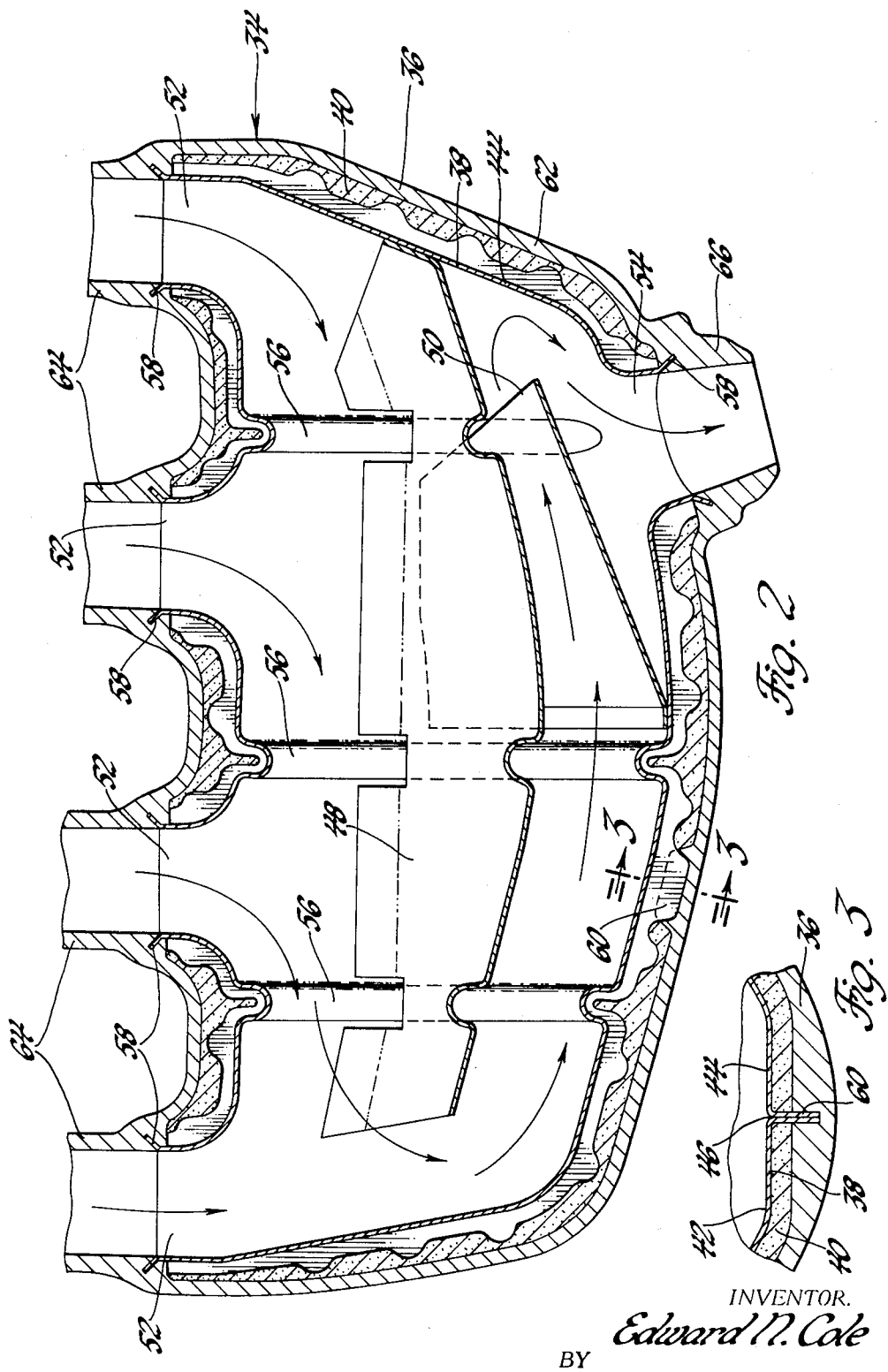

ENGINE EXHAUST REACTOR AND METHOD OF MAKING

BACKGROUND OF THE INVENTION

This invention relates to exhaust gas reactors for use with internal combustion engines and, more particularly, to the construction and method of making a high efficiency, low cost, lined and insulated exhaust reactor.

It is known in the internal combustion engine art to utilize an exhaust gas reactor in the exhaust system to further the burning of combustibles remaining in the engine exhaust gases after they leave the combustion chamber and thereby substantially reduce emissions of hydrocarbons, carbon monoxide and the like from an operating engine. Such exhaust reactors may take the place of the usual engine exhaust manifold and provide an enlarged chamber that is insulated and arranged to form an extended flow path for the passage of exhaust gases therethrough.

The combination of low heat loss and extended residence time of the exhaust gases provided by such reactor manifolds encourages substantially complete combustion of any remaining combustible mixture to take place during passage of the exhaust gases through the manifold. Where necessary, additional air may be supplied to the engine exhaust system to mix with the exhaust gases and provide a mixture suitable for substantially complete combustion within the manifold reactor.

SUMMARY OF THE INVENTION

The present invention provides practical constructions and methods of making exhaust reactors for the above-described purposes. The constructions involve the use of a supporting and protecting outer shell, preferably of cast iron, which surrounds and protects a non-porous inner liner, preferably of sheet metal, the reactors being insulated by an insulating layer, preferably of core sand, that is formed between the inner liner and outer shell. The construction is such that the core sand insulating layer is completely encapsulated between the inner liner and outer shell so that there is no danger of shifting of the sand particles after assembly.

Manufacture of the unit is accomplished by first fabricating the inner shell and applying to the outer surfaces thereof to be insulated a layer of core sand. The outer iron casing is then cast around both the core sand layer and the inner liner with protruding portions of the liner being mechanically interlocked with the cast outer shell. In this way, the relative positions of the liner and outer shell are positively fixed and the insulating layer of sand is completely encapsulated between the two.

The preferred construction provides a practical and efficient exhaust reactor which is relatively inexpensive to manufacture and yet is highly reliable and failsafe. These and other advantages of the construction and method of its manufacture will be more apparent from the following description of a preferred embodiment taken together with the accompanying drawings.

BRIEF DESCRIPTION OF THE DRAWINGS

In the drawings:

FIG. 2 is a cross-sectional view of the exhaust reactor of FIG. 1 taken in the plane indicated by the line 2—2 of FIG. 1; and FIG. 3 is a fragmentary cross-sectional view showing a construction detail of the exhaust reactor taken in the plane indicated by the line 3—3 of FIG. 2.

DESCRIPTION OF THE PREFERRED EMBODIMENT

Figure 1:
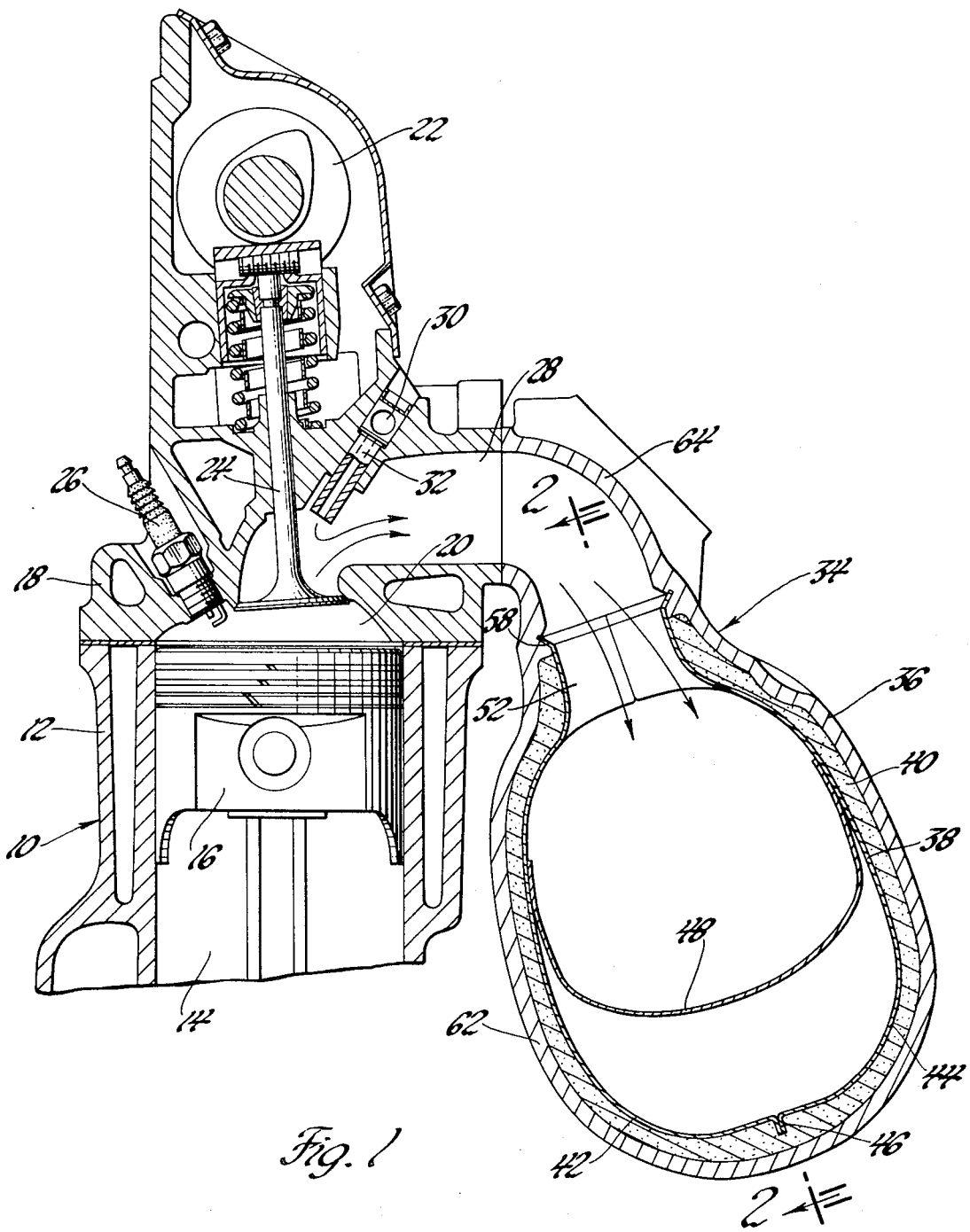
FIG. 1 is a cross-sectional view of an internal combustion engine in combination with a preferred embodiment of exhaust reactor formed according to the invention.

In the drawings, numeral 10 generally indicates an internal combustion engine of known construction, including a cylinder block 12 having a plurality of cylinders 14 receiving pistons 16. A cylinder head 18 is mounted on the upper portion of the block 12 and closes the upper ends of the cylinders, defining therewith a plurality of combustion chambers 20.

A camshaft 22, carried in the cylinder head, directly actuates a plurality of inlet valves, not shown, and exhaust valves 24 to respectively control the admission of fuel mixtures to and the exhaust of combustion products from the combustion chambers 20. A plurality of spark plugs 26 are provided to initiate combustion in the chambers 20 in a conventional manner.

Exhaust ports 28 are provided through which exhaust products from the combustion chambers leave the cylinder head upon the opening of valves 24. Additional air is delivered to the exhaust ports through a pump connected air gallery 30 which feeds air to nozzles 32 located at each of the exhaust ports 28.

In order to provide means for completing the burning of combustibles which may be present in the exhaust gases, the engine 10 is provided with an exhaust reactor manifold formed according to the present invention and generally indicated by numeral 34. Manifold 34 preferably includes a cast iron outer shell 36, a stainless steel inner liner 38 and an intermediate layer 40 of core sand encapsulated between the inner liner and outer shell and acting as an insulating medium.

As seen in FIGS. 1 – 3, the main portion of the inner liner 38 is formed of two sheet metal halves 42, 44 which are preferably welded together along a flanged seam 46. A pair of longitudinally extending baffles 48 and 50 are secured within the enlarged chamber defined by liner 38 to provide an extended flow path for exhaust gases passing therethrough from the inlet port openings 52 to the single outlet port opening 54.

A number of generally circumferential indentations 56 are provided intermediate the inlet port openings 52 to give some longitudinal flexibility. This reduces stresses due to longitudinal expansion and contraction of the liner due to the large temperature changes to which it is exposed. Although any suitable non-porous material may be used for the liner and baffles, I prefer to use stainless steel because of its ability to withstand high combustion temperatures and corrosion from the exhaust products.

The liner inlet and outlet ports are provided with outwardly flared flanges 58 which protrude into the cast iron outer shell 36. In addition, a protruding portion 60 of the flange seam 46 extends into engagement with a portion of the cast iron shell 36, thus assisting the action of the flanges 58 in securely locking the liner 38 in position within the outer shell 36.

The intermediate insulating layer 40 is preferably formed of core sand, although alternatively other suitable insulating material may be used. In construction of the manifold, the insulating layer is applied around the inner liner after its assembly so that the entire liner is coated with a casting core of sand, leaving protruding only the port flanges 58 and portions such as seam protrusion 60, which it is desired to interlock with the cast metal of the outer shell. The port openings are then plugged by suitable core plugs and the outer shell is cast around the inner liner and sand core to form the finished product.

In finished form, the outer shell, which is preferably of cast iron but alternatively may be made of other suitable material, completely encapsulates the core sand between it and the inner liner. Thus, breaking up of the sand particles does not permit them to move about nor settle, but instead retains them in place for use as insulation in the intended manner.

In addition to a main body portion 62, the outer shell includes a plurality of inlet port defining portions 64 which connect the inlet port openings of the inner liner with the exhaust ports of the cylinder head. Portions 64 include suitable means, not shown, by which the manifold 34 is retained in place on the cylinder head of the engine. In like manner, the outer shell includes an outlet port connection 66 which connects with the liner outlet port opening 54 and provides means by which the manifold may be secured to an exhaust conduit.

As constructed, the outer shell 36 of the manifold is required to both support the structure and provide protection against external damage to it both in handling and during operation. For this reason, as well as due to cost advantages, it is desirable to use cast iron as the material for this shell with the thickness of the shell being sufficient to adequately perform its functions. An additional advantage of the use of a substantial cast iron outer shell is that should there be a failure of the inner liner, the outer shell will remain intact and prevent the escape of exhaust products within the engine compartment.

While the invention has been described by reference to a preferred embodiment, it should be apparent that numerous changes could be made in the construction without departing from the inventive concepts disclosed. Accordingly, the invention is intended to be limited only by the language of the following claims.

I claim:

1. An exhaust reactor for an internal combustion engine, said reactor comprising
    an inner passage defining liner of non-porous material capable of withstanding combustion temperatures,
    an intermediate layer of core sand insulating material formed around said inner liner and
    a unitary cast metal outer shell surrounding said inner liner and encapsulating said insulating material between said liner and said shell, said outer shell having inlet and outlet ports for exhaust gases to enter into the exit from said liner passage and means for connecting said inlet and outlet ports with such engine and an exhaust system respectively, said metal outer shell having sufficient thickness and strength to support said reactor in its operating environment and to resist impact damage during handling and operation.

2. The reactor of claim 1 wherein portions of said inner liner are mechanically interlocked with portions of said outer shell independently of said intermediate insulating layer.

3. The reactor of claim 1 wherein said inner liner defines an enlarged chamber and is provided with baffle means in said chamber to define an extended flow path for exhaust gases passing through said reactor.

4. An exhaust reactor manifold for an internal combustion engine, said manifold comprising an inner liner formed of high temperature resistant sheet metal and defining a gas flow passage with inlet and outlet openings,
    an intermediate insulating layer of core sand formed around the walls of said inner liner and
    a unitary cast iron shell surrounding said inner liner and encapsulating said core sand between said inner liner and said shell, said shell having inlet and outlet ports connecting with said inner liner openings and means at said ports for connecting said manifold with such engine and an exhaust system respectively.

5. The manifold of claim 4 wherein said inner liner is formed of stainless steel.

6. The method of constructing an insulated and lined exhaust reactor for use with an internal combustion engine, said method comprising the steps of
    fabricating an inner passage defining liner of non-porous material capable of withstanding combustion temperatures,
    forming around said inner liner an intermediate layer of sand insulating material capable of acting as a casting core, and
    casting a supporting and protecting outer shell around said intermediate layer and said inner liner so as to completely encapsulate said intermediate layer between said inner liner and said shell.

7. The method of constructing an insulated and lined exhaust reactor for use with an internal combustion engine, said method comprising
    fabricating an inner passage defining liner of non-porous material capable of withstanding combustion temperatures, said liner having a plurality of protruding portions,
    forming an intermediate layer of sand insulating material, capable of acting as a casting core, around said inner liner while leaving said liner protruding portions exposed and
    casting a supporting and protecting outer shell around said intermediate layer and said inner liner so as to completely encapsulate said intermediate layer between said inner liner and said shell and to mechanically interlock said outer shell with said protruding portions of said inner liner independently of said intermediate layer.

8. The method of constructing an insulated and lined exhaust reactor manifold for use with an internal combustion engine, said method comprising the steps of
    fabricating an inner liner including baffles of high temperature resistant sheet metal to define an enlarged chamber with an extended gas flow path therethrough, said fabricating step including providing said inner liner with a plurality of protruding portions, forming an intermediate layer of core sand around the exterior of said inner liner except for said protruding portions, and casting a supporting and protecting iron outer shell around said sand layer and said sheet metal liner so as to completely encapsulate said sand layer between said sheet metal liner and said cast iron shell and to mechanically interlock said liner protruding portions with said cast iron shell independently of said sand layer.

* * * * *